['United States Patent'] [15] 3,666,678
Mosier et al. [45] May 30, 1972

[54] PROCESS OF ENCAPSULATING BASIC NITROGEN COMPOUNDS WITH ACID-PRECURSOR GELATIN

[72] Inventors: Benjamin Mosier, Houston, Tex.; Charles E. Tippett, Dayton, Ohio

[73] Assignee: Said Benjamin Mosier

[22] Filed: Jan. 12, 1968

[21] Appl. No.: 697,306

Related U.S. Application Data

[63] Continuation-in-part of Ser. No. 433,501, Feb. 17, 1965, abandoned, which is a continuation-in-part of Ser. No. 316,540, Oct. 16, 1963, abandoned.

[52] U.S. Cl. ..........................252/316, 117/100, 252/8.55, 252/390, 252/392, 264/4, 424/37
[51] Int. Cl. ................B01j 13/02, C23f 11/14, A01n 17/00
[58] Field of Search ...............252/316, 8.55 E, 392; 264/4; 424/16; 117/100; 424/37

[56] References Cited

UNITED STATES PATENTS

| | | | |
|---|---|---|---|
| 2,460,259 | 1/1949 | Kahler | 252/8.55 E X |
| 2,800,457 | 7/1957 | Green et al. | 252/316 |
| 2,833,712 | 5/1958 | Jones | 252/8.55 E |
| 2,914,557 | 11/1959 | Oxford | 252/392 X |
| 3,028,308 | 4/1962 | Zambito et al. | 252/316 X |
| 3,069,370 | 12/1962 | Jensen et al. | 252/316 X |
| 3,270,100 | 8/1966 | Jolkovski et al. | 252/316 X |

*Primary Examiner*—Richard D. Lovering
*Attorney*—Carl C. Batz

[57] ABSTRACT

Process of microencapsulation employing acid precursor (type A) gelatin as the encapsulating macrocolloid, particularly applicable to the formation of liquid center microcapsules containing a basic (cationic) nitrogen compound. For example, an aqueous solution of acid-precursor gelatin is mixed at an alkaline pH with a water-immiscible organic solvent solution of the nitrogen compound, such as an amine or quaternary. The pH of the mixture and the gelatin phase is reduced to at least 4.0 and preferably 3.0 or below, the liquid phases being intermixed to disperse and emulsify the organic solvent phase in the aqueous phase, thereby providing minute droplets of the basic nitrogen containing organic solvent surrounded by the aqueous solution of the acid-precursor gelatin. On the completion of the pH reduction, the gelatin will have formed a coating around the individual droplets to provide encapsulating skins therefor. While the encapsulated droplets can be recovered with some success at the lowest acid pH, it is much preferred to raise the pH to a pH at least above 5.5 and preferably to an alkaline pH before recovering the microcapsules. An auxiliary coating can be applied to the recovered microcapsules by contacting them with an aqueous solution of alkali-precursor gelatin.

11 Claims, No Drawings

PROCESS OF ENCAPSULATING BASIC NITROGEN COMPOUNDS WITH ACID-PRECURSOR GELATIN

CROSS REFERENCES TO RELATED APPLICATIONS

This application is a continuation-in-part of co-pending application Ser. No. 433,501, filed Feb. 17, 1965, as a continuation-in-part of parent application Ser. No. 316,540, filed Oct. 16, 1963, both now abandoned.

BACKGROUND

Processes for forming microcapsules using macrocolloids as the encapsulating material were known and in commercial use in the United States prior to the present invention. Such processes can be used for encapsulating droplets of a water-immiscible organic solvent containing other substances dissolved or dispersed therein. In general, the technique involves the formation of an emulsion of the organic solvent in an aqueous solution of a single macrocolloid or of two different macrocolloids. While maintaining the oil-in-water type emulsion, the conditions of the aqueous macrocolloid phase are then changed in such maintaining the oil-in-water type emulsion, the conditions of the aqueous macrocolloid phase are then changed in such a way as to form a copious macrocolloid coacervate. In the coacervate phase, the macrocolloid forms a film around the dispersed droplets, thereby producing the microcapsules.

With respect to the conditions required to form the coacervate phase, there has been a sharp distinction both theoretically and in commercial practice between "simple" coacervation employing a single macrocolloid and "complex" coacervation using two different macrocolloids. The differing conditions and procedures for simple and complex coacervation are described in detail in Kruyt, *Colloid Science*, Vol. 2 (1949).

For simple coacervation, the single colloid can be thrown out of aqueous solution into the coacervate phase by addition of a salt. Microencapsulation by such coacervation process is described in U.S. Pat. No. 2,800,458 (now Re. 24,899). After the capsules are formed, the microcapsular material can be cooled below the gelation temperature of the macrocolloid to set and harden the coating.

For formation of microcapsules by complex coacervation, two different hydrophilic colloid materials having opposite electric charges are employed. After the emulsion has been formed, the conditions are changed to cause complex coacervation to occur. As is well known in the art, the conditions for complex coacervation using different colloids are quite different from those for simple coacervation using a single colloid. For example, the addition of a salt inhibits complex coacervation, while it promotes simple coacervation. Further, complex coacervation is known to be affected by pH change, while simple coacervation is produced by the addition of precipitating agents, such as salts and alcohols.

Microencapsulation by complex coacervation is described in U.S. Pat. No. 2,800,457. According to the process of this patent, the complex coacervation is produced by dilution, that is, adding water to the colloid mixture. In one variation of the procedure, the pH of the mixture is adjusted upwardly so that the complex coacervation will not be brought about by water dilution of the mixture while water is added in an amount which would have caused the complex coacervation had not the pH been adjusted upwardly. Thereafter the pH of the mixture is adjusted downwardly, thereby forming the complex coacervate material, which provides the coating for the dispersed oil droplets.

Although the encapsulation of nitrogen compounds within liquid center microcapsules has been recognized as desirable for use in various applications, prior to the present invention coacervation with macrocolloids has not been successfully applied to the encapsulation of nitrogen compounds such as amines or quaternaries. Amines and quaternaries dissolved in oil solvents are extremely difficult, if not impossible, to encapsulate by known processes, such as the simple coacervation process of Green Re. 24,899 or the complex coacervation process of Green et al. 2,800,457. Apparently the presence of the nitrogen compound in the emulsified oil droplets interferes with the formation of microcapsules having liquid-retaining skins.

SUMMARY

This invention is based in part on the discovery that basic nitrogen compounds can be encapsulated by employing a single hydrophilic colloid; namely an acid-precursor gelatin. Contrary to the teachings of the art, the encapsulation is accomplished by a series of simple pH changes without the addition of salt or other colloid precipitating agent. In fact, it is questionable whether the process can be described as involving the formation of a coacervate phase, since the gelatin remains soluble in the aqueous phase at the pH's of encapsulation. The gelatin does deposit or coalesce around the dispersed droplets of the organic solvent containing the basic nitrogen compound and thus is "coacervated" in the coating layers or "skins" of the droplets, but no continuous coacervate phase is formed, as with prior art processes of simple or complex coacervation. When the process is performed without the presence of the droplets containing the nitrogen compound, substantially no "clouding" of the solution can be observed at the optimum pH's for encapsulation. At no time during the pH changes of the process is a copious coacervate phase formed.

The exact mechanism of the microencapsulation process of this invention is still not fully understood, but it appears to involve an electrostatic or coulombic attraction between the acid-precursor gelatin and the basic nitrogen compound. For example, there is evidence indicating that when the nitrogen compound is omitted from the droplets, and the drops comprise only an organic solvent, such as kerosene, liquid retaining microcapsules cannot be formed, even though all other conditions of the processs remain the same.

Studies relating to the encapsulation mechanism of this invention are still far from conclusive, but they indicate that optimum encapsulation occurs when the acid-precursor gelatin is essentially anionic, that is, when the net charge on the gelatin molecules is such that the gelatin will tend to migrate toward an anode, and thereby be attracted to the cationic nitrogen compound. Further, it has been found that the net charge characteristic of the acid-precursor gelatin, as well as the character of the emulsion, is responsive to and is affected by solution pH. Consequently, the optimum process is one where the conditions for a homogenous oil-in-water emulsion coincide or at least overlap with the maximum net negative charge for the acid-precursor gelatin.

These inventive concepts will now be illustrated in terms of preferred embodiments of a process of encapsulating basic nitrogen compounds with acid-precursor gelatin.

DETAILED SPECIFICATION

The process of this invention is applicable to basic (cationic) organic nitrogen compounds. In general, such compounds contain at least one basic nitrogen atom, and may be aliphatic, cyclic, or cyclo-aliphatic, such as aliphatic or cyclic amines and quaternaries. The basic nitrogen may be a primary, secondary, or tertiary amine nitrogen, or the nitrogen atom may be in the form of a quaternary ammonium nitrogen. The basic nitrogen atom may also be in the form of a cyclic nitrogen compound, which may be secondary, tertiary, or quaternary, and more than one basic nitrogen can be present such as with the diamines and diquaternaries. Amine zwitterions, such as N-substituted trimethylene diamine -N'-alkanoic acids, can also be used. Such amine zwitterions can be employed as corrosion inhibitors in the form of organic acid salts and esters. Hydroxamic acids, such as oleoyl hydroxamic acid, can also be encapsulated by the method of this invention. The nitrogen compounds can contain from one to 30 carbon atoms, but will usually contain from about four to 22 carbons.

Where the aliphatic group is obtained from a fatty acid source, the aliphatic group will usually be an alkyl or alkylene group containing from 12 to 18 carbon atoms. The compounds may contain more than one aliphatic group as well as more than one basic nitrogen atom. The basic nitrogen may be in the form of a free base, or may be in its salt form, such as an organic acid salt, a fatty acid salt, or a napthenic acid salt.

It will be understood that corrosion inhibition bactericidal, or other desired properties of the nitrogen compounds can vary considerably, and, therefore, in practicing the present invention, a nitrogen compound will be selected which provides the desired properties for the particular application. Typical corrosion inhibition and bactericidal uses of the microcapsular products which can be produced by the process of this invention are described in copending application Ser. No. 451,285, filed Apr. 27, 1965. The aliphatic amines, such as the fatty primary amines and the fatty diamines, provide a preferred subclass for application as corrosion inhibitors and/or bactericidal agents. Many compounds coming within this subclass provide both corrosion inhibition and bactericidal properties to a considerable extent, and the application involves both corrosion inhibition and bactericidal action. Where it is desired to maximize both properties in a combined application, two or more nitrogen compounds, such as the aliphatic amines, can be employed together.

In the process of this invention, the nitrogen compound is dispersed in an organic solvent which is capable of forming a separate organic solvent phase in admixture with a gelatin-water phase. The nitrogen compound may be dissolved in the organic solvent, or the nitrogen compound can be introduced in the organic solvent as a colloidal suspension. The term "-dispersion" is therefore used herein as covering both true solutions and colloidal dispersions. The organic solvent functions as a carrier for the nitrogen compound and permits the nitrogen compound to be effectively encapsulated within a water-soluble coating or "skin".

A wide variety of organic solvents can be used, although the hydrocarbon solvents are particularly satisfactory. In general, the organic solvent should be at least partially immiscible with the gelatin-water phase under the conditions of the process, thereby making it possible to form a dispersed organic solvent phase containing the nitrogen compound. It will be understood that the organic solvent is preferably completely inert with respect to the nitrogen compound. Also the organic solvent is preferably one which does not cause gelatin to deteriorate or denature even on prolonged contact. By way of specific example, kerosene or diesel fuel can be mentioned as particularly desirable solvents. Other similar hydrocarbon solvents, including both aliphatic and aromatic hydrocarbons, can also be used. Chlorinated hydrocarbon solvents are also suitable in certain applications. Partially water miscible solvents, such as n-butanol, can be used by employing as the dispersed phase, the excess organic solvent over that required to saturate the gelatin-water phase. Some organic solvents may be miscible with water, but will become immiscible or only partially miscible when the nitrogen compound is dissolved therein, and thereby can be used. Isopropyl alcohol can be used in this way.

The concentration of the nitrogen compound in the organic solvent can vary over a wide range. However, it is generally preferred to employ a relatively high concentration. For example, concentrations of at least 15–35 percent by weight of the nitrogen compound in the solvent mixture are advantageous. However, lower or higher concentrations can be used, such as concentrations ranging from about 5–50 percent or higher. The mixture of the organic solvent and the nitrogen compound should be fluid and should be liquid at the temperature used for the encapsulation, which will normally be at an elevated temperature, such as 40° C. or above. Consequently, the organic solvent in some applications may comprise as little as 5–40 percent of the mixture. By way of specific example, 75 parts by weight of tallow trimethylene diamine dinapthenate may be dispersed in 25 parts by weight of kerosene to produce a suitable dispersion for encapsulation.

In practicing the method of this invention, an aqueous solution of an acid-precursor gelatin is employed as the encapsulating medium. Such gelatins are well known to the gelatin industry, and are readily available commercially. Acid-precursor gelatins are produced by an acid extraction of the collagen, and are also known as type A gelatins. Alternatively, the collagen material can be soaked under acid conditions and then extracted at an approximately neutral pH to obtain the acid-precursor gelatin. The acid-precursor gelatins are further characterized by having a neutral or slightly basic isoelectric point. The acid-precursor gelatin is preferably used as manufactured, and without chemical modification or conversion to derivatives. It is desirable that the gelatin at the concentrations of the process be soluble in water at both alkaline and acid pH's.

The concentration of the aqueous gelatin solution should not be so high at the temperature utilized to the solution to set up or gel. Conversely, the concentration should not be so low that there is not sufficient concentration of gelatin available for the desired encapsulation. Relatively dilute solutions of gelatin are advantageous. For example, the concentration of gelatin solution may run from 0.5–5 or 8 percent or higher by weight, while a concentration of about 1–5 percent will usually be satisfactory.

The gelatin solution may be used at any temperature above its gel point and below the temperature at which the gelatin would begin to deteriorate. For example, a temperature within the range from 35°–70° C. can be used. Usually, however, the most desirable temperatures may range from about 38°–60° C.

In practicing the present invention, a mixture is formed of two liquid phases, one of which is essentially the above-described aqueous solution of acid-precursor gelatin, and the other is essentially the above-described organic solvent containing the nitrogen compound. Unless the acid-precursor gelatin has been previously adjusted to an acid pH, it will be advantageous to form the two phase liquid mixture at an alkaline pH, and then reduce the pH of the mixture, or more specifically of the gelatin phase, to an acid pH of at least 4.0 and preferably below 4.0. Advantageously, the pH can be reduced to at least 3.0 and preferably to about 3.0 to 2.0. The phases are intermixed to disperse and emulsify the organic solvent phase in the aqueous phase, thereby providing minute droplets of the basic nitrogen compound containing organic solvent surrounded by the aqueous solution of the acid-precursor gelatin. Under these conditions, the acid-precursor gelatin forms a coating on the droplets. While the resulting microcapsular material can be recovered at a low acid pH, much improved results are obtained by raising the pH to a pH of at least 5.5 and preferably to an alkaline pH in the range of 7.5–11.

In one embodiment of the present invention, the organic solvent dispersion of the nitrogen compound is mixed with the aqueous gelatin solution at an alkaline pH within the range from 7.5–11. Any required pH adjustment can be made with sodium hydroxide or other suitable alkaline reagent, but the natural pH of the mixture will normally be suitable. Advantageously, the initial pH of the mixture, or more specifically of the aqueous solution of gelatin can be within the range from about 8.5–10.5, which can be the pH obtained by simply mixing the ingredients.

The gelatin functions as an emulsifying agent, but standard emulsifying agents can be employed, such as ethoxylated nonyl phenol or an ethoxyoctyl phenol, to promote the formation of the desired oil-in-water type of emulsion. Desirable emulsifying agents of this type usually have been prepared by condensation of from 15 to 60 mols of ethylene oxide with each mol of the octyl or nonyl phenol. Other emulsifying agents of the oil-in-water type can also be used.

Other ingredients may also be incorporated in the mixture from which the capsular material is to be formed, such as a substantially water-insoluble metal compound in the form of a fine powder. For example, a salt, oxide, or hydroxide of a polyvalent metal may be included. Powdered lead oxide is particularly desirable, and powdered barium sulfate can also be advantageously employed. The incorporation of such metal compound to produce weighted microcapsules is described in copending application Ser. No. 451,285, filed Apr. 27, 1965. While the incorporation of such weighting agents is not essential for carrying out the encapsulating method of the present invention, the use of a powdered polyvalent metal compound provides certain process advantages. For example, it can promote emulsion formation and/or stability, that is, the fine powder functions as an auxiliary emulsifying agent. For this purpose, the aqueous gelatin phase can contain from 10–150 (or preferably 20–120) parts by weight of the metal compound per each 100 parts of the aqueous gelatin.

The initial mixture at the alkaline pH may tend to be non-homogeneous, containing both oil-in-water and water-in-oil emulsions in varying proportions. However, this is not detrimental to the process of this invention. As the next step in the process, the mixture can be subjected to a pH change from alkaline to acidic. For example, the pH of the mixture can be reduced gradually while continually agitating or stirring the mixture by the addition of a suitable acidic reagent, such as an inorganic acid like hydrochloric acid. This pH adjustment to the acid side is preferably continued until a relatively homogeneous oil-in-water emulsion is present. The mixture can be observed by eye during the pH adjustment to determine its conditions, or samples may be periodically subjected to microscopic examination. The presence of a substantially continuous water phase with a dispersed oil phase may also be detected by electrical resistivity measurements. Even when part of the oil phase is undispersed, the dispersed portions will form the desired capsules. Since the pH adjustment from alkaline to acidic involves passing through the isoelectric range of the alkali-precursor gelatin, a partial phase inversion may occur with an increase in the proportion of water-in-oil emulsion to oil-in-water emulsion. Under most conditions of operation, the most desirable pH range will be from about 4.0 down to about 2.0. After the completion of the pH reduction, the solution will contain the microcapsular material comprising minute droplets of the water-immiscible solvent having the nitrogen compound dispersed therein, and the droplets being enclosed in an outer skin of gelatin. If desired, the microcapsular material may be separated and recovered at this point by any suitable procedure, such as centrifugation or filtration, thereby partially or completely separating the microcapsular material from the supernatant solution.

However, it will usually be desirable to subject the microcapsule-containing mixture to another pH adjustment before separation or recovery of the microcapsular material. More specifically, the pH of the supernatant solution containing the microcapsular material may be readjusted with an alkaline reagent to a pH above 5.5. Preferably, the final pH is within the range from 7.5–11.0. A final pH of about 8–10 is advantageous. The pH readjustment promotes the formation of the microcapsular material, or more particularly, the growth and strengthening of the gelatin skins around the liquid droplets. Resistivity measurements indicate that the oil-in-water character of the emulsion also is further improved by the pH readjustment. Here again, the theory or mechanism involved is not understood. However, the effect of the pH readjustment can be observed by microscopic examination of samples of the material before, during, and after the pH readjustment.

Following the pH adjustments, the microcapsular material can be conveniently recovered or concentrated by a salting-out procedure employing a salt such as sodium sulfate, ammonium sulfate, magnesium chloride, aluminum chloride, aluminum sulfate, and the like. Alternatively, the microcapsular material can be recovered or concentrated by centrifugation. Where a salt solution is added, such as a sodium sulfate solution, the microcapsular material will tend to settle to the bottom and the supernatant can then be removed by decanting.

The remaining material, comprising a concentrated slurry of the microcapsular material, can then be shipped or used in this form. In fact, this has been found to be a very convenient form for storage and handling. In the recovery operation, the temperature of the material will ordinarily be reduced below the gelation temperature of the gelatin (viz., to room temperature, 20°–25° C.), thereby setting and hardening the gelatin coating.

If desired, the microcapsular material can be subjected to an auxiliary coating procedure to produce thicker gelatin skins, thereby making the capsular material more slowly solubilized. For example, the capsules can be separated from the remaining supernatant solution by centrifugation or filtration, and then introduced into an aqueous gelatin solution. Since the gelatin used for the original encapsulation was acid-precursor gelatin (Gelatin A), the gelatin solution used for the auxiliary coating procedure should be an alkali-precursor gelatin (gelatin B). For example, the second gelatin solution may contain the alkali-precursor gelatin in a concentration of from 0.5–5 percent by weight, preferably about 1–3 percent by weight. The solution can be kept at a temperature of about 40°–55 C. If desired, a pH adjustment may be used with the auxiliary coating step, although this is not required. At its natural pH and at the temperature specified, the gelatin of different isoelectric pH will tend to form a second skin or coating around the microcapsular material. If desired, this coating may be further promoted by reduction in temperature of the coating solution, although this is not normally required.

The method of this invention is further illustrated by the following specific examples:

EXAMPLE 1

162.5 grams of coco primary amino acetate (Armac C), 50 grams of tallow trimethylene diamine dinapthenate (Duomeen TDS-75, 75 percent active, 25 percent kerosene), 150 grams powdered lead oxide, and 37.5 grams of kerosene were mixed together at 40° C. 10 grams of acid-precursor gelatin (gelatin A, 175 bloom) were dissolved in 150 milliliters of water and added to this mixture. With the temperature at 40° C., the pH of the mixture was slowly adjusted with continuous mixing from the initial pH of 9.5 to 4.0 with 18 percent hydrochloric acid. The time required for the addition of the acid was about 6–8 hours. The encapsulation at the pH 4.0 was acceptable, although some undispersed oil phase was present as water-in-oil emulsion. The encapsulated material was separated out in a 20 percent solution of sodium sulfate at 25° C.

The material was stirred in the sodium sulfate solution for 30 minutes and filtered by suction filtration. After the sodium sulfate solution had been filtered off, the material was stirred into 300 milliliters of water in which 6.0 grams of alkali-precursor gelatin (gelatin B, 200-bloom) had been dissolved. The material was separated out in a 20 percent solution of sodium sulfate. While the encapsulated material was being stirred in the sodium sulfate solution, the pH was adjusted to 9.8 with 35 percent NaOH solution. The stirring time was 30 minutes.

EXAMPLE 2

A mixture of the ingredients described in Example 1 is prepared following the same procedure, except that the lead oxide is first dispersed in the gelatin prior to the addition of the Armac C and Duomeen TDS-75. This order of addition has been found to have an advantage. If it is desired to incorporate an emulsifying agent such as Igepal CO-887 (ethoxylated nonyl phenol), this can be added with the Duomeen TDS-75 and Armac C, or added to the completed mixture.

The pH of the completed mixture is adjusted with hydrochloric acid as described in Example 1, except that the addition of the acid is continued until the pH reaches approximately 3–2.5. At this point, a stable oil-in-water emulsion is present. The pH is then readjusted to the alkaline side with sodium hydroxide. The final pH is at least 8.0, and preferably in the range 8.5 to 9.5. The encapsulated product is then separated and further processed by treatment with alkali-precursor gelatin.

EXAMPLE 3

4.74 grams of acid-precursor gelatin (gelatin A, 175-bloom) is dissolved in 76.5 ml. of water. 75 grams of lead oxide is thoroughly mixed with the aqueous gelatin. To the resulting dispersion is added 81 grams of Armac C (coco primary amine acetate), 25 grams of Duomeen TDS-75 (75 percent active, 25 percent kerosene), and 25 cc. of kerosene. Duomeen TDS-75 is tallow trimethylene diamine dinapthenate. All of these ingredients are thoroughly mixed together, and the mixing is continued throughout the balance of the process.

Starting with an initial pH of about 9.3, the pH is reduced to about 2.5 by adding 150 ml. of 18 percent hydrochloric acid. The acid is added slowly over a period of about 6 hours. The pH is then readjusted with 20 ml. of 35 percent sodium hydroxide to a final pH of about 6.0. At this pH, the emulsion is stable, and contains the encapsulated product. The product may then be separated and recovered.

EXAMPLE 4

The encapsulated product of the foregoing examples can be stirred into a 20% $Na_2SO_4$ solution. The stirring can be continued for 30 minutes. This operation can be done with the $Na_2SO_4$ solution at room temperature. After the $Na_2SO_4$ solution has been filtered off, the material can be stirred into 15 gallons of $H_2O$ into which has been dissolved 4 lbs. of alkali-precursor gelatin (gelatin B) at 50° C. The stirring is continued until there is a homogeneous mixture. The mixture can then be stirred into 50 gallons of a 20% $Na_2SO_4$ solution. The stirring is continued for 30 minutes. This operation can be done with the $Na_2SO_4$ solution at room temperature. After the 30 minute stirring period, the stirring is stopped and the material is allowed to settle out. After the material has settled, the excess $Na_2SO_4$ solution is drawn off. The material remaining is the encapsulated product with the auxiliary gelatin coating.

While in the foregoing specification this invention has been described in relation to specific embodiments thereof, and many details have been set forth for the purpose of illustration, it will be apparent that the invention is not limited to the specific examples set forth and that many of the details may be varied considerably without departing from the basic concepts and principles of the invention.

We claim:

1. A process of microencapsulation by simple coacervation comprising:
    a. forming a mixture of two liquid phases one of which is essentially an aqueous solution of a single macrocolloid and the other is essentially an at least partially water-immiscible organic solvent having an organic basic nitrogen compound selected from the class consisting of amines and quaternaries dispersed therein, said macrocolloid being an acid-precursor gelatin soluble in water at both alkaline and acid pH's and said aqueous gelatin phase being initially at an alkaline pH;
    b. reducing the pH of said aqueous gelatin phase to an acid pH of at least 4.0 and intermixing said phases to disperse and emulsify said organic solvent phase in said aqueous phase, thereby providing minute droplets of said organic solvent containing basic nitrogen compound surrounded by said aqueous solution of said acid-precursor gelatin, said acid-precursor gelatin forming a coating on said droplets and providing encapsulating skins therefor; and
    c. recovering the encapsulated droplets thus produced.

2. The process of claim 1 wherein the pH of said aqueous gelatin phase in admixture with said organic solvent phase is reduced to at least 3.0.

3. The process of claim 1 wherein said nitrogen compound is dissolved in said organic solvent in a concentration of from 5–50 percent by weight.

4. The process of claim 1 wherein said gelatin phase is initially at a pH of from 8.5–10.5 and a concentration of from about 0.5–5 percent gelatin by weight.

5. A process of microencapsulation by simple coacervation comprising:
    a. forming a mixture of two liquid phases one of which is essentially an aqueous solution of a single macrocolloid and the other is essentially an at least partially water-immiscible organic solvent having an organic basic nitrogen compound dispersed therein, said macrocolloid being an acid-precursor gelatin soluble in water at both alkaline and acid pH's and said nitrogen compound being selected from the class consisting of amines and quaternaries, said mixture and said aqueous gelatin phase being initially at a pH of from 7.5–11;
    b. reducing the pH of said mixture and said aqueous gelatin phase to an acid pH of at least 4.0 and intermixing said phases to disperse and emulsify said organic solvent phase in said aqueous phase; thereby providing minute droplets of said organic solvent containing basic nitrogen compound surrounded by said aqueous solution of said acid-precursor gelatin, said acid-precursor gelatin forming a coating on said droplets and providing encapsulating skins therefor;
    c. raising the pH of said gelatin phase to at least 5.5; and
    d. recovering the encapsulated droplets thus produced.

6. The process of claim 5 wherein after said pH reduction but before recovering said gelatin encapsulated droplets the pH of said mixture is raised to an alkaline pH.

7. The process of claim 5 wherein said mixture as originally formed contains a substantially water-insoluble inorganic salt of a polyvalent metal compound in the form of a fine powder.

8. The process of claim 5 wherein said acid-precursor gelatin encapsulated droplets are further processed by being contacted with an aqueous solution of alkali-precursor gelatin, thereby forming an auxiliary coating of said alkali-precursor gelatin on the acid-precursor gelatin skins of said droplets.

9. A process of microencapsulation by simple coacervation comprising:
    a. forming a mixture of two liquid phases one of which is essentially an aqueous solution of a single macrocolloid and the other is essentially an at least partially water-immiscible organic solvent having an organic basic nitrogen compound dispersed therein, said macrocolloid being an acid-precursor gelatin soluble in water at both alkaline and acid pH's and being present in said aqueous phase in a concentration of from 0.5–5 percent gelatin by weight, said nitrogen compound being selected from the class consisting of amines and quaternaries and being dissolved in said organic solvent in a concentration of from 5–50 percent by weight said mixture and said gelatin phase being initially at a pH of from 8.5–10.5;
    b. reducing the pH of said mixture and said gelatin phase to an acid pH of at least 3.0 and intermixing said phases to disperse and emulsify said organic solvent phase in said aqueous phase, thereby providing minute droplets of said organic solvent containing basic nitrogen compound surrounded by said aqueous solution of said acid-precursor gelatin; said acid-precursor gelatin forming a coating on said droplets and providing encapsulating skins therefor;
    c. raising the pH of said mixture and said gelatin phase to a pH of from 7.5–11;
    d. recovering the encapsulated droplets thus produced; and
    e. contacting said encapsulated droplets with an aqueous solution of alkali-precursor gelatin having a concentration of 0.5–5 percent gelatin by weight.

10. The process of claim 9 wherein said mixture as originally formed contains a substantially water-insoluble inorganic salt of a polyvalent metal compound in the form of a fine powder dispersed in said aqueous gelatin phase in an amount of from 20–120 parts by weight of said metal compound per each 100 parts of said aqueous gelatin phase.

11. The process of claim 1 wherein said amines and quaternaries contain about four to 22 carbon atoms.

* * * * *